US011633849B2

(12) United States Patent
Hawkes et al.

(10) Patent No.: US 11,633,849 B2
(45) Date of Patent: Apr. 25, 2023

(54) SOFT ROBOTIC DEVICE WITH FLUID EMISSION FOR BURROWING AND CLEANING

(71) Applicant: The Regents of the University of California, Oakland, CA (US)

(72) Inventors: Elliot Hawkes, Santa Barbara, CA (US); Nicholas Naclerio, Portola Valley, CA (US)

(73) Assignee: The Regents of the University of California, Oakland, CA (US)

(*) Notice: Subject to any disclaimer, the term of this patent is extended or adjusted under 35 U.S.C. 154(b) by 134 days.

(21) Appl. No.: 17/277,665

(22) PCT Filed: Sep. 13, 2019

(86) PCT No.: PCT/US2019/050998
§ 371 (c)(1),
(2) Date: Mar. 18, 2021

(87) PCT Pub. No.: WO2020/060858
PCT Pub. Date: Mar. 26, 2020

(65) Prior Publication Data
US 2021/0354289 A1 Nov. 18, 2021

Related U.S. Application Data

(60) Provisional application No. 62/733,147, filed on Sep. 19, 2018.

(51) Int. Cl.
*B25J 9/14* (2006.01)
*B25J 18/06* (2006.01)
*E21B 7/26* (2006.01)

(52) U.S. Cl.
CPC ............... *B25J 9/142* (2013.01); *B25J 18/06* (2013.01); *E21B 7/26* (2013.01)

(58) Field of Classification Search
CPC .............. B25J 9/142; B25J 18/06; E21B 7/26
See application file for complete search history.

(56) References Cited

U.S. PATENT DOCUMENTS 4,798,341 A * 1/1989 Gimple ................ B25J 19/0029 239/290
4,900,218 A * 2/1990 Sutherland ............... B25J 18/06 901/22

(Continued)

OTHER PUBLICATIONS

Maladen et al., "Mechanical models of sandfish locomotion reveal principles of high performance subsurface sand-swimming", Journal of the Royal Society Interface, 2011, pp. 1332-1345, vol. 8, No. 62, The Royal Society Publishing.

(Continued)

*Primary Examiner* — David M Fenstermacher

(74) *Attorney, Agent, or Firm* — Greer, Burns & Crain, Ltd.; Steven P. Fallon

(57) ABSTRACT

A soft robot includes a main body configured as a tube inverted back inside itself to define a pressure channel, such that when the channel is pressurized, the main body everts, and inverted material everts and passes out of a tip at a distal end of the main body. A fluidization tube for passing air or other fluid through a core of the main body in the fluidization tube, wherein the fluidization tube engages the main body such that the fluidization tube is ejected as the distal end as the main body everts and joins part of the side of the main body as the main body everts and extends its distal tip.

18 Claims, 11 Drawing Sheets

(56) References Cited

U.S. PATENT DOCUMENTS

| | | | | |
|---|---|---|---|---|
| 5,080,000 | A | 1/1992 | Bubic | |
| 5,735,627 | A * | 4/1998 | Nagao | B25J 17/0291 901/29 |
| 5,964,407 | A * | 10/1999 | Sandkleiva | B05B 13/0431 239/416.1 |
| 6,835,248 | B1 * | 12/2004 | Haas | B05B 13/0431 901/43 |
| 2007/0016328 | A1 * | 1/2007 | Ziegler | A47L 9/009 701/23 |
| 2009/0182436 | A1 * | 7/2009 | Ferrara | A63B 21/0085 623/57 |
| 2013/0091974 | A1 | 4/2013 | Riwan et al. | |
| 2013/0167683 | A1 | 7/2013 | Cianchetti et al. | |
| 2014/0109560 | A1 | 4/2014 | Ilievski et al. | |
| 2019/0217908 | A1 | 7/2019 | Hawkes et al. | |
| 2019/0299424 | A1 * | 10/2019 | Curhan | B25J 19/0075 |
| 2020/0324416 | A1 * | 10/2020 | Collmer | B25J 5/02 |
| 2021/0060766 | A1 * | 3/2021 | Krauthamer | B25J 11/003 |

OTHER PUBLICATIONS

Girmscheid et al., "Tunnel Boring Machines", Practice Periodical on Structural Design and Construction, 2003, pp. 150-163, vol. 8, No. 3, American Society of Civil Engineers.

Tsinker, "Performance of jetted anchor piles with widening", Journal of the Geotechnical Engineering Division, 1977, pp. 213-226, vol. 103, No. 3, American Society of Civil Engineers.

Hosoi et al.,"Beneath Our Feet: Strategies for Locomotion in Granular Media", Annual Review of Fluid Mechanics, 2015, pp. 431-453, vol. 47, Annual Reviews.

Maladen et al., "Granular lift forces predict vertical motion of a sand-swimming robot", 2011 IEEE International Conference on Robotics and Automation, 2011, pp. 1398-1403, IEEE.

Koller-Hodac et al., "Actuated Bivalve Robot: Study of the Burrowing Locomotion in Sediment", 2010 IEEE International Conference on Robotics and Automation, 2010, pp. 1209-1214, IEEE.

Winter et al., "Teaching RoboClam to Dig: The Design, Testing, and Genetic Algorithm Optimization of a Biomimetic Robot", The 2010 IEEE/RSJ International Conference on Intelligent Robots and Systems, 2010, pp. 4231-4235, IEEE.

Winter et al., "Razor clam to RoboClam: burrowing drag reduction mechanisms and their robotic adaptation", Bioinspiration & Biomimetics, 2014, pp. 1-11, vol. 9, IOP Publishing Ltd, United Kingdom.

Sadeghi et al., "Toward Self-Growing Soft Robots Inspired by Plant Roots and Based on Additive Manufacturing Technologies", Soft Robotics, 2017, pp. 211-223, vol. 4, No. 3, Mary Ann Liebert, Inc.

Nagaoka et al., "Experimental Study on Autonomous Burrowing Screw Robot for Subsurface Exploration on the Moon", 2018 IEEE/RSJ International Conference on Intelligent Robots and Systems, 2018, pp. 4101-4109, IEEE.

Russell, "CRABOT: A Biomimetic Burrowing Robot Designed for Underground Chemical Source Location", Advanced Robotics, 2011, pp. 119-134, vol. 25, No. 1-2, Koninklijke Brill NV, Leiden and The Robotics Society of Japan.

Zagal et al., "Deformable Octahedron Burrowing Robot", Artificial Life, 2012, pp. 431-438, vol. 13, Massachusetts Institute of Technology.

Sadeghi et al., "Robotic Mechanism for Soil Penetration Inspired by Plant Root", 2013 IEEE International Conference on Robotics and Automation, 2013, pp. 3457-3462, IEEE.

"Stanford researchers develop vine-like, growing robot" (Stanford) Jul. 19, 2017 (Jul. 19, 2017) [online] retrieved from < URL: https://www.youtube.com/watch?v=oRjFFgAZQnk&feature=emb_title >.

Coad et al., "Vine Robots: Design, Teleoperation and Deployment for Navigation and Exploration", IEEE Robotics & Automation Magazine, 2020, pp. 120-132, vol. 27, No. 3, IEEE.

Naclerio et al., "Soft Robotic Burrowing Device with Tip-Extension and Granular Fluidization", 2018 IEEE/RSJ International Conference on Intelligent Robots and Systems, 2018, pp. 5918-5923, IEEE.

Winter et al., "Razor clam to RoboClam: burrowing drag reduction mechanisms and their robotic adaptation", Bioinspiration & Biomimetics, 2014, pp. 1-11, vol. 9, No. 3, IOP Publishing Ltd.

International Search Report and Written Opinion from the corresponding International Patent Application No. PCT/US2019/050998, dated Jan. 3, 2020.

* cited by examiner

SOFT ROBOTIC DEVICE WITH FLUID EMISSION FOR BURROWING AND CLEANING

PRIORITY CLAIM AND REFERENCE TO RELATED APPLICATION

The application claims priority under 35 U.S.C. § 119 and all applicable statutes and treaties from prior U.S. provisional application Ser. No. 62/733,147, which was filed Sep. 19, 2018.

STATEMENT OF GOVERNMENT INTEREST

This application was made with government support under grant number 1637446 awarded by the National Science foundation. The government has certain rights in this invention.

FIELD

A field of the invention is robotics.

BACKGROUND

Hawkes et al. US Published Application No. 20190217908 discloses a growth robot that has a thin-walled, hollow, pressurized, compliant body that elongates the body by everting from its tip new wall material that is stored inside the body. The robot controls the shape of the body by actively controlling the relative lengths of the wall material along opposing sides of the body allowing steering. Steering control is provided in one embodiment via a small pneumatic control chambers and a camera mounted on the tip for visual feedback of the environment. The camera is held in place by a cable running through the body of the robot. The lengthening soft robot disclosed includes two main components: an extending body and a base. Along the length of the extending body are control chambers that can be selectively inflated by the solenoid valves. There are chambers along two sides (for creating 2D shapes during lengthening) or three sides (for creating 3D shapes during extension). When a chamber is inflated during lengthening, the material at the tip of the inflated control chamber side lengthens. This creates a turn in the direction away from the inflated control chamber. The robot is capable of movement in environments lacking substantial resistance, i.e. open environments.

Other types of robots such as aerial drones, autonomous submarines, and Martian rovers can similarly move through air, water, and over ground. However, few robots can move through the ground or other materials providing comparable physical resistance. Not only are the forces resisting movement much greater than in air or water, but the interaction forces are more complicated in ground, or in sand, gravel, ash, dry snow, or any other granular material.

Subterranean locomotion is difficult due to the substantial forces resisting movement. R. D. Maladen, Y. Ding, P. B. Umbanhowar, A. Kamor, and D. I. Goldman, "Mechanical models of sandfish locomotion reveal principles of high performance subsurface sand-swimming," Journal of The Royal Society Interface, vol. 8, no. 62, pp. 1332-1345 (2011). Most work on moving below ground has been in the field of conventional drilling, where methods include auger drilling, hydraulic-rotary drilling, and tunnel boring machines. G. Girmscheid and C. Schexnayder, "Tunnel boring machines," Practice periodical on structural design and construction, vol. 8, no. 3, pp. 150-163 (2003). These techniques that create holes are not attractive to provide access to small robots because of the complex, large and expensive machinery required. Another boring technique typically used in coastal areas is water jetting, which is often used to drive piles into soft sand and clay. This method uses a high-pressure water jet to fluidize the sand beneath a heavy piling, allowing it to sink under its own weight. G. P. Tsinker, "Performance of jetted anchor piles with widening," Journal of Geotechnical and Geoenvironmental Engineering, vol. 103, no. 3, (1977).

Burrowing animals and plant roots have inspired several recent attempts to create robots capable of subterranean locomotion. A. Hosoi and D. I. Goldman, "Beneath our feet: strategies for locomotion in granular media," *Annual Review of Fluid Mechanics*, vol. 47 (2015); R. D. Maladen, P. B. Umbanhowar, Y. Ding, A. Masse, and D. I. Goldman, "Granular lift forces predict vertical motion of a sand-swimming robot," in Robotics and Automation (ICRA), 2011 IEEE International Conference on. IEEE, pp. 1398-1403 (2011). The sand swimming robot in Maladen et al. was modeled on a sandfish lizard, and moved by undulating its body while having a sloped head to help burry it. Other work imitates the behavior of clams which use the motion of their shell to fluidize the layer of wet sand surrounding them. A. Koller-Hodac, D. P. Germann, A. Gilgen, K. Dietrich, M. Hadorn, W. Schatz, and P. E. Hotz, "Actuated bivalve robot study of the burrowing locomotion in sediment," in Robotics and Automation (ICRA), 2010 IEEE International Conference on. IEEE, pp. 1209-1214 (2010); A. G. Winter, R. L. Deits, D. S. Dorsch, A. E. Hosoi, and A. H. Slocum, "Teaching roboclam to dig: The design, testing, and genetic algorithm optimization of a biomimetic robot," in Intelligent Robots and Systems (IROS), 2010 IEEE/RSJ International Conference on. IEEE, pp. 4231-4235 (2010); A. Winter, R. Deits, D. Dorsch, A. Slocum, A. Hosoi et al., "Razor clam to roboclam: burrowing drag reduction mechanisms and their robotic adaptation," Bioinspiration & biomimetics, vol. 9, no. 3, p. 036009, (2014). Another approach used a filament extruder to burrow with reduced drag on the side walls of the robot body. A. Sadeghi, A. Mondini, and B. Mazzolai, "Toward self-growing soft robots inspired by plant roots and based on additive manufacturing technologies," Soft robotics, vol. 4, no. 3, pp. 211-223 (2017). Other mechanisms include a screw mechanism [K. Nagaoka, T. Kubota, M. Otsuki, and S. Tanaka, "Experimental study on autonomous burrowing screw robot for subsurface exploration on the moon," in Intelligent Robots and Systems, IROS 2008. IEEE/RSJ International Conference on. IEEE, 2008, pp. 4104-4109 (2008)], a crab inspired robot [R. A. Russell, "Crabot: A biomimetic burrowing robot designed for underground chemical source location," Advanced Robotics, vol. 25, no. 1-2, pp. 119-134 (2011)], and a deformable octahedron [J. C. Zagal, C. Armstrong, and S. Li, "Deformable octahedron bur-rowing robot." in ALIFE (2012)]. One study inspired by the apical growth of plant roots used an everting skin to reduce friction on a rigid shaft as it penetrated into a granular soil. A. Sadeghi, A. Tonazzini, L. Popova, and B. Mazzolai, "Robotic mechanism for soil penetration inspired by plant root," in Robotics and Automation (ICRA), 2013 IEEE International Conference on. IEEE, pp. 3457-3462 (2013). The device features a rigid, hollow, shaft with a soft everting skin stored inside of it. As the shaft is driven into the soil, an electromagnetic motor pulls the skin out of the shaft to match the motion of the shaft. As a result, the skin pushes aside soil at the tip of the device, and then remains stationary relative to the soil as the shaft penetrates the soil, reducing friction. This rigid device does not feature pneumatic growth, fluidization, or steering.

SUMMARY OF THE INVENTION

A preferred embodiment is a soft robot that includes a main body configured as a tube inverted back inside itself to define a pressure channel, such that when the channel is pressurized, the main body everts and inverted material everts and passes out of a tip at a distal end of the main body. The robot also includes a fluidization tube for passing air or other fluid through a core of the main body in the fluidization tube. The fluidization tube engages the main body such that the fluidization tube is ejected as the distal end as the main body everts and joins part of the side of the main body as the main body everts and extends its distal tip.

DESCRIPTION OF THE PREFERRED EMBODIMENTS

Preferred embodiments provide a soft robotic device that has an apical extension and includes fluid emission for burrowing and cleaning Preferred embodiment soft robots are able to burrow through sand or dirt, in a manner analogous to a plant root. The robot extends apically through eversion, while emitting fluid from the tip that fluidizes sand and soil making it possible to grow underground.

Preferred soft robot devices can also be used for cleaning or delivering fluid to difficult to reach spaces. Operation is analogous to burrowing except the fluid would be used for cleaning instead of soil fluidization. The device could be used to cheaply, and noninvasively burrow under obstacles to install wiring or irrigation, for example. It could also be used in search and rescue after mudslides, and also to quickly lay a root-like foundation structure in soft earth. Other applications include placing shallow sensors underground or conducting underground inspections. Preferred applications include cleaning difficult to reach spaces, such as inside complex machinery, aircraft, fuel tanks, pipes, or other obstacles. Additionally, the preferred soft robots can be used to install thin elongate objects into a granular material because it creates a physical conduit with its body. Example thin, elongate objects include electrical lines, optical lines and tools that can be passed through this physical conduit. Fluids can also be delivered through physical conduit.

Example prototypes consistent with the invention have demonstrated an ability to burrow through dry sand while requiring an order of magnitude less force than a similarly sized intruding cylinder. The prototype device leverages the principles of both tip-extension and granular fluidization. Like roots, the device extends from its tip; the principle of tip-extension eliminates skin drag on the sides of the body, because the portion of the body contacting the granular medium is stationary with respect to the medium. The prototype used an everting, pressure-driven thin film body. The second principle, granular fluidization, enables a granular medium to adopt a dynamic fluid-like state when pressurized fluid is passed through it, reducing the forces acting on an object moving through it. The prototype provided granular fluidization via a flow of air through the core of the body that mixes with the medium at the tip.

Additional details regarding preferred embodiments of the invention are discussed next respect to experiments, prototypes and the drawings. The applications and broader aspects of the invention will be understood by artisans in view of the general knowledge in the art and the description of the preferred embodiments that follows.

Figure 1A:
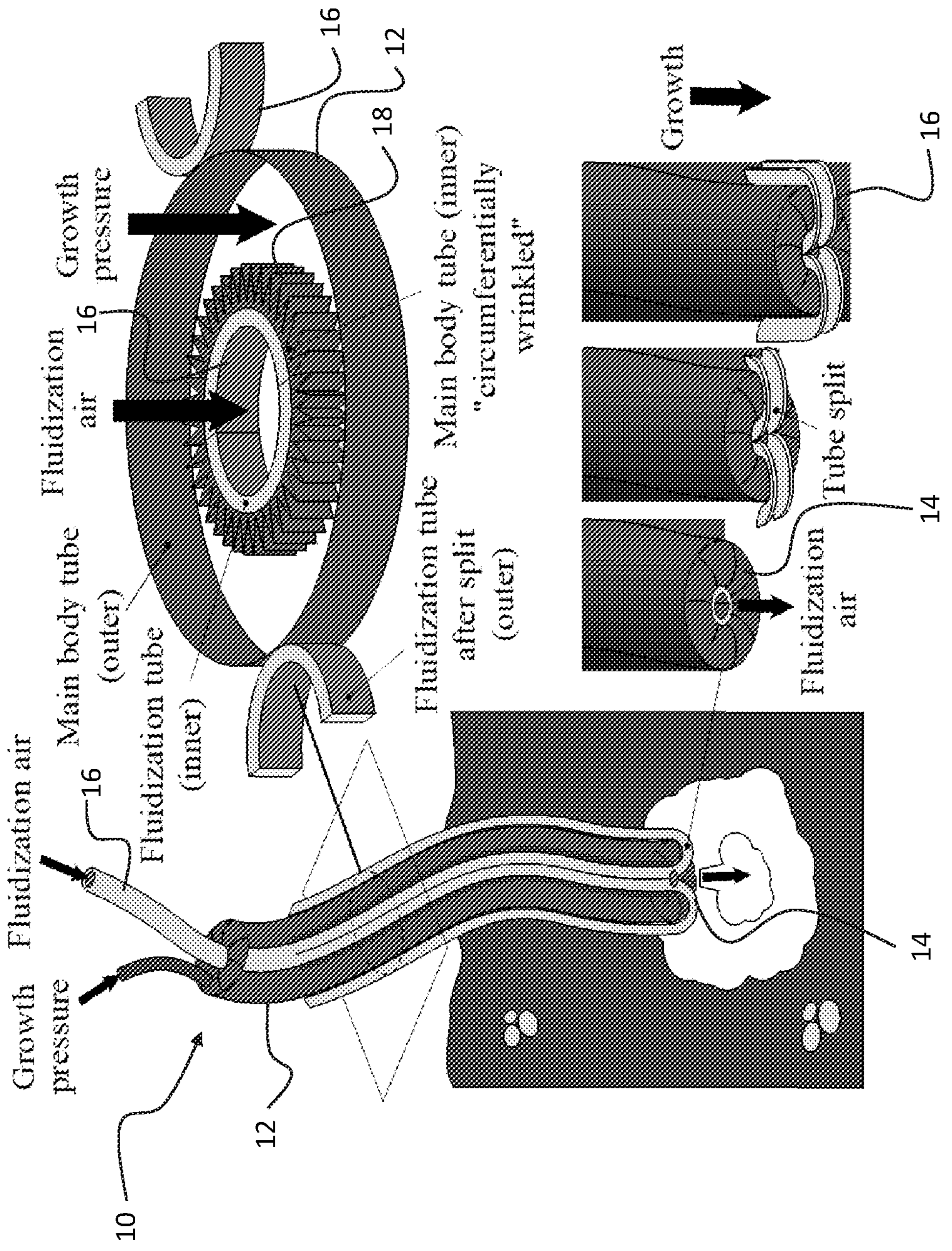
FIG. 1A illustrates a preferred embodiment soft robot with fluid emission.

FIG. 1A illustrates a preferred embodiment soft robot 10. The soft robot 10 consists of two main components: a main body tube 12, and a fluidization tube 16. The main body tube is made of a pressurized, thin-walled, tube, configured such that it is inverted back inside itself. As such, when the main body tube is pressurized, the tubing everts and new material passes out of the tip 14, which is shown extending into a granular material, e.g. soil. The main body tube is made of an airtight material, as shown in FIG. 1, or a porous material and an airtight bladder as shown in FIG. 2. The fluidization tube 16 is for passing air or another fluid through the core of the main body 12 and out the tip of the robot 14.

The fluidization tube 16 is split lengthwise and attached to opposite sides of the main body 12 such that the fluidization tube splits and becomes part of the side of the soft robot 10 as the robot grows and extends. An external device such as a compressed gas source, chemical reaction, or water pump provides growth pressure in the main body tube 12 to cause eversion while the same device or a similar one provides fluidization fluid (e.g., air or water) to pass through the fluidization tube 16 to enable the robot to grow through granular material with limited resistance. An inner portion 18 of the main body is circumferentially wrinkled, which allows it to fit inside of the pressurized main body. The wrinkles can be intentionally introduced via folds to create pleats as depicted in FIG. 1. However, loose main body material will naturally create less patterned wrinkles when the material is inverted into itself. As the robot everts, this material is pulled out the front of the robot, allowing it to extend from the tip. This allows the body to remain stationary relative to the environment, eliminating drag along the sides of the stationary body.

Figure 1B:
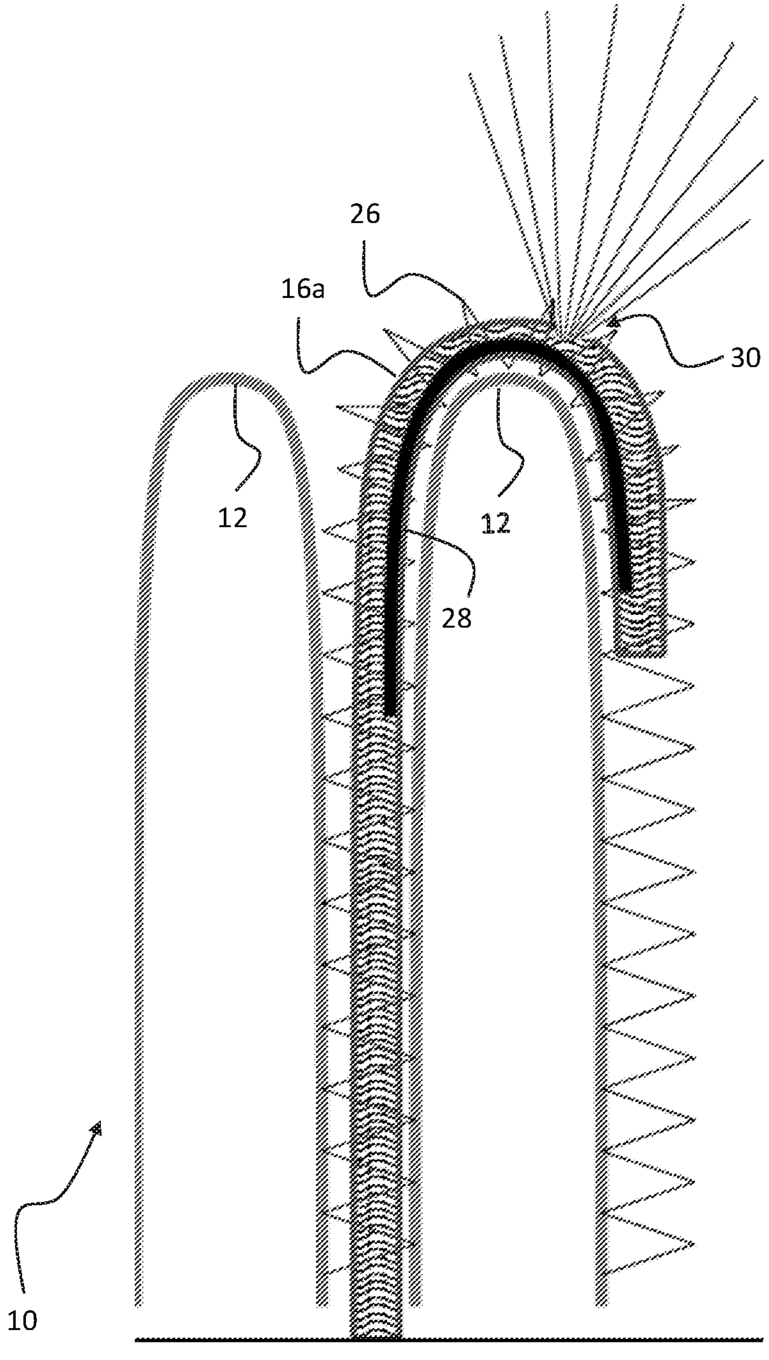
FIG. 1B illustrates a preferred variation of the FIG. 1A soft robot.

FIG. 1B shows a soft robot 10 consistent with FIG. 1A that uses a different fluidizing tube 16*a* which permits the fluidizing fluid to help control lift and drag while burrowing. The fluidization tube in FIG. 1A is replaced with a coil spring. The fluidizing tube 16*a* is contained within a coil spring 26. The fluidizing tube is a mobile flexible fluidization tube that can slide through the coil spring 26 as the main body everts. To keep the flexible fluidization tube 16*a* positioned at the tip of the robot, a rigid hook 28 is attached to the inside of the flexible fluidization tube 16*a*. The rigid hook 28 remains at the tip of the robot because it cannot deform as the robot everts. Fluidization fluid is passed through the flexible fluidization tube, and out a hole 30 in the flexible fluidization tube. The hole is positioned such that fluidization fluid is passed in a desired direction.

Preferred materials for the main body include thin, flexible, airtight membranes. Most preferred are textiles such as silicone or urethane coated ripstop nylon for their flexibility, durability and ability to hold air pressure.

Preferred materials for the fluidization tube 16 include rigid tubes or flexible coil springs. Most preferred are flexible coil springs because they allow air to freely pass through them.

The selection of materials, dimensions and pressures/flows for the growth pressure and the fluidization will depend upon the granular material to be encountered. The following discussion guides artisans in determining how to select materials, dimensions and pressures/flows.

Model of Tip-Extension Forces

Different parameters affect growing forces and can be optimize variations of the present invention to suit particular applications. In the ideal case, the balanced forces at the tip of the soft robot would be:

$$F_{driving} = F_{external} \quad (1)$$

where $F_{driving}$ is equivalent to the internal pressure, P, times the cross-sectional area, A, and $F_{external}$ is the net growing force pushing against the medium. However, in reality, not all of the driving force, PA, is transferred to the medium. The actual force transferred to the medium, $F_{external}$, can be approximated by the addition of a proportional term, k, and an offset term, $F_{offset}$, leading to $$F_{driving} - F_{offset} = F_{external}. \quad (2)$$

The proportional term arises largely from axial tension in the body of the device that partially counters the driving force. For the offset force, Blumenschein et al. [L. H. Blumenschein, A. M. Okamura, and E. W. Hawkes, "Modeling of bioinspired apical extension in a soft robot," in Conference on Biomimetic and Biohybrid Systems. Springer, pp. 522-531 (2017)] showed that for an extension without burrowing or fluidization at the tip:

$$F_{offset} = [YA + F_v] - [F_l + \Sigma_i F_{Ci}] \quad (3)$$

Blumenschein et al. also found that YA is constant for a given tube material, and independent of tube diameter. Thus, Foffset is constant among identically constructed devices of different diameters. Therefore, once k and Foffset are determined for a given burrowing device, the external force, Fexternal, can be predicted from the internal pressure, P:

$$F_{external} = PAk - F_{offset} \quad (5)$$

For the device to burrow, the external force it exerts must be greater than the counteracting force of the medium into which it is burrowing (Fmedium). In other words:

$$F_{medium} < F_{external} = PAk - F_{offset}. \quad (6)$$

Radius for Maximum Tip-Extension Force

It is also possible to predict the radius of body that would enable the largest external pressure applied to the granular medium before bursting, due to hoop stress in the body. Using the equation for hoop stress in a thin-walled pressure vessel, the internal pressure can be written as:

$$P = \sigma_\theta t / r \quad (7)$$

where σθ is hoop stress, t is wall thickness, and r is radius. Substituting in the yield stress, σy, and inserting back into Eqn. 5 along with Fexternal=PexternalA and A=πr2 we have:

$$\sigma_y t k / r - F_{offset} / (\pi r^2) = P_{external} \quad (8)$$

We again assume that Foffset is independent of diameter. Taking the derivative with respect to r, setting it to zero, and solving for r, we find that the maximum external pressure is at the following radius:

$$r = 2 F_{offset} / (\pi \sigma_y t k) \quad (9)$$

For a given radius, a robot with a thicker or stronger body material can withstand a higher pressure. (9) shows that for a thicker, or stronger body material the robot can exert the maximum amount of pressure at a smaller radius. This assumes that the pressure required to fluidize is lower than the pressure used to inflate the body.

Prototype Details

A prototype consistent with the soft robot 10 in FIG. 1 has been fabricated and tested. Artisans will appreciate additional details of preferred embodiments from the following discussion of the prototype.

The main components of the prototype robotic burrowing device are: a 2.7 cm diameter main body made of 0.05 mm thick rip-stop nylon main body fabric sewn together with nylon thread, a 2.7 cm diameter bladder made of 0.05 mm thick low density polyethylene (LDPE), a fluidization tube made of a flexible 8 mm outer-diameter tube and 0.125 mm thick acetate strips with hot glue. The main body determines the device's shape and robustness, the bladder provides a good air seal, and the fluidization tube provides a flow of air out of the tip of the device. The bladder is only needed if the material of the main body is not air/fluid tight. If air/fluid tight material is used, the bladder can be omitted. Air/fluid tight material can be formed into the main body by gluing, welding, melting, etc. instead of sewing, or by using sewing techniques with sealed threads and an overlap to provide air/fluid tight integrity.

Figure 2A:
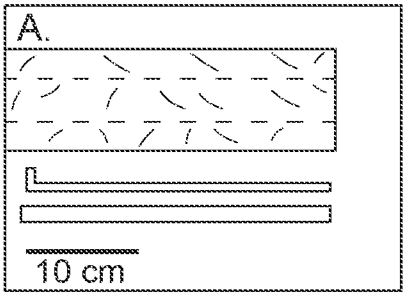
FIGS. 2A-2H illustrate a preferred fabrication method of making a prototype soft robot of the invention with a bladder.
Figure 2B:
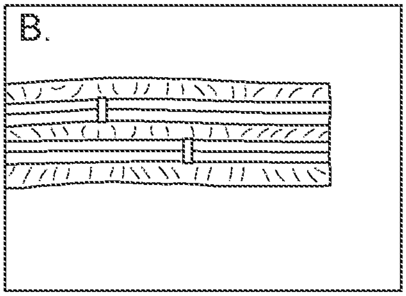
Figure 2C:
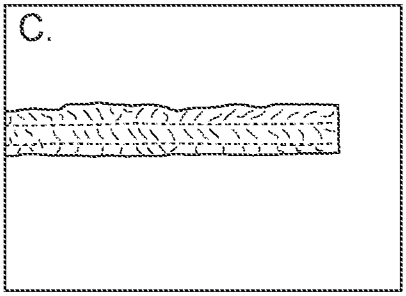
Figure 2D:
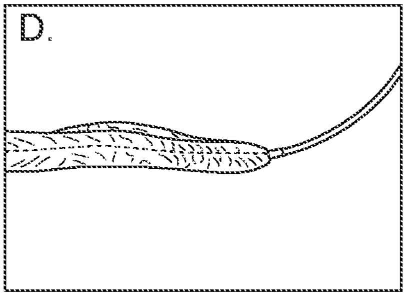
Figure 2E:
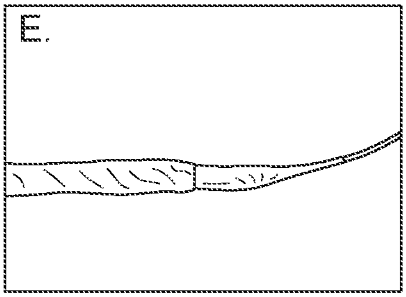
Figure 2F:
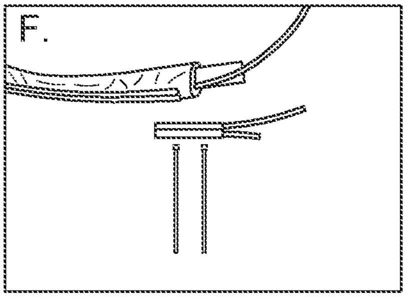
Figure 2G:
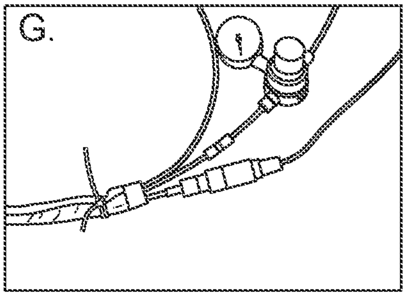
Figure 2H:
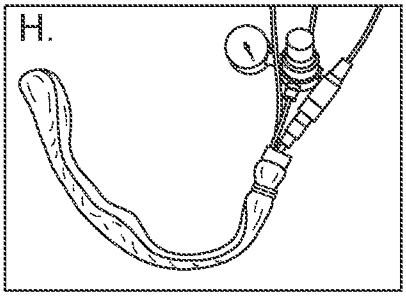

The manufacturing steps to form the prototype that included a bladder are shown in FIGS. 2A-2H. In FIG. 2A, a strip of nylon fabric (main body) is cut to device length and slightly wider than tube circumference (about 10 cm). In FIG. 2B, two strips of acetate are sewed along the length of the nylon fabric, spaced apart so that they will lay flat on each other when the nylon fabric is folded in half lengthwise. Two beads of hot glue are placed along the length of one of the strips, spaced evenly apart. As the acetate strips lay against each other, the gap created between them by the glue creates the fluidization tube. In FIG. 2C, the fabric is folded in half lengthwise and sewn along the edge, creating a tube. In FIG. 2D, the fluidization tube is attached to the inside of the fabric (main body) tube, between the acetate strips such that air will flow into the fabric tube, and into the fluidization tube between the acetate strips. In FIG. 2E, the bladder is placed over the completed main body and taped to the fluidization tube. In FIG. 2F, the bladder is inverted, and then the main body is pulled over it. Three short air tubes are then prepared: one for the growth pressure, a second for a pressure sensor, and a third for the fluidization tube to pass through. In FIG. 2G, the inner and main bodies are sealed around the air tubes with a zip tie, allowing the fluidization tube to pass through one of them. In FIG. 2H, the completed device is shown and will now grow when pressurized by the growth pressure, pulling the fluidization tube along with it. Air can flow out of the tip through the fluidization tube. Growth can be reversed by retracting the fluidization tube.

Figure 2I:
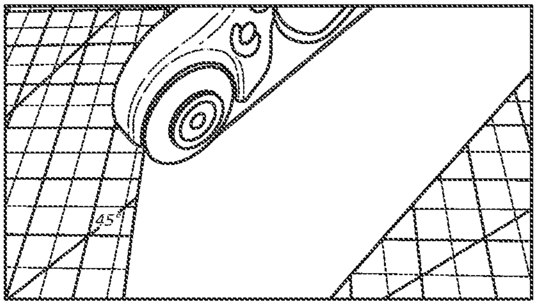
FIGS. 2I-2N illustrate a preferred fabrication method of making a prototype soft robot of the invention without a bladder.
Figure 2J:
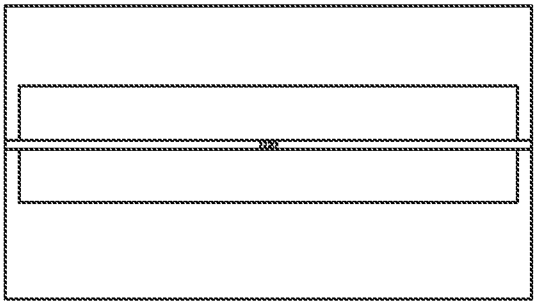
Figure 2K:
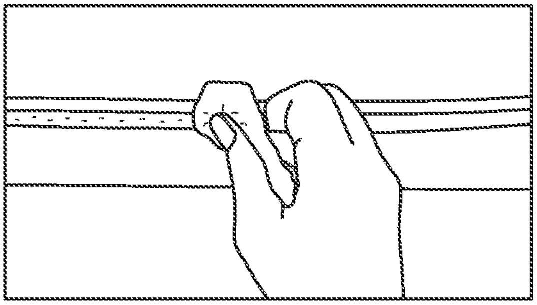
Figure 2L:
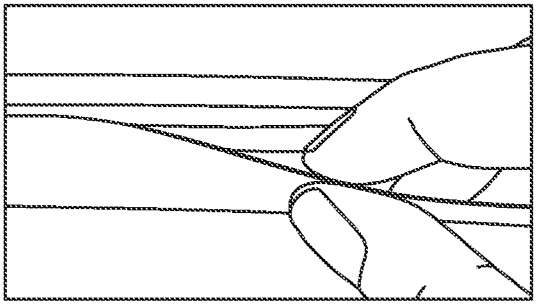
Figure 2M:
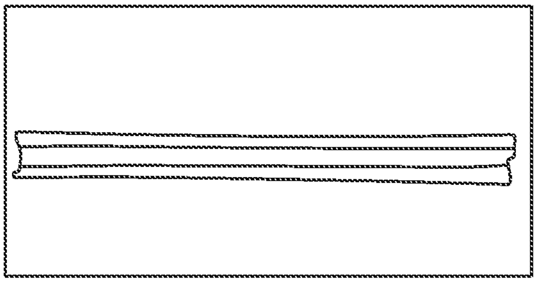
Figure 2N:
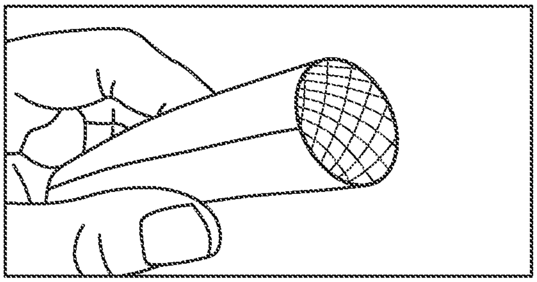

Preferred method steps to make a soft robot of the invention out of an airtight material without a bladder are shown in FIGS. 2I-2N. In FIG. 2I, a strip of fabric is cut to the desired main body length. In FIG. 2J the strip is placed on a work surface, and a thin strip of double-sided tape is placed along its center lengthwise, attaching to the work surface at each end to hold the fabric in place for the next steps. In FIG. 2K, one side of the strip is folded over and adhered to the tape. Then, a thin, continuous bead of silicone adhesive is placed along the length of the edge of the fabric. In FIGS. 2L and 2M, the other side of the fabric is first folded over and then adhered to the silicone adhesive by applying pressure to create a lap joint. After waiting for the adhesive to cure, the completed tube can be everted to remove the double-sided tape, as shown in FIG. 2N.

Prototype Testing and Analysis

Figure 3:
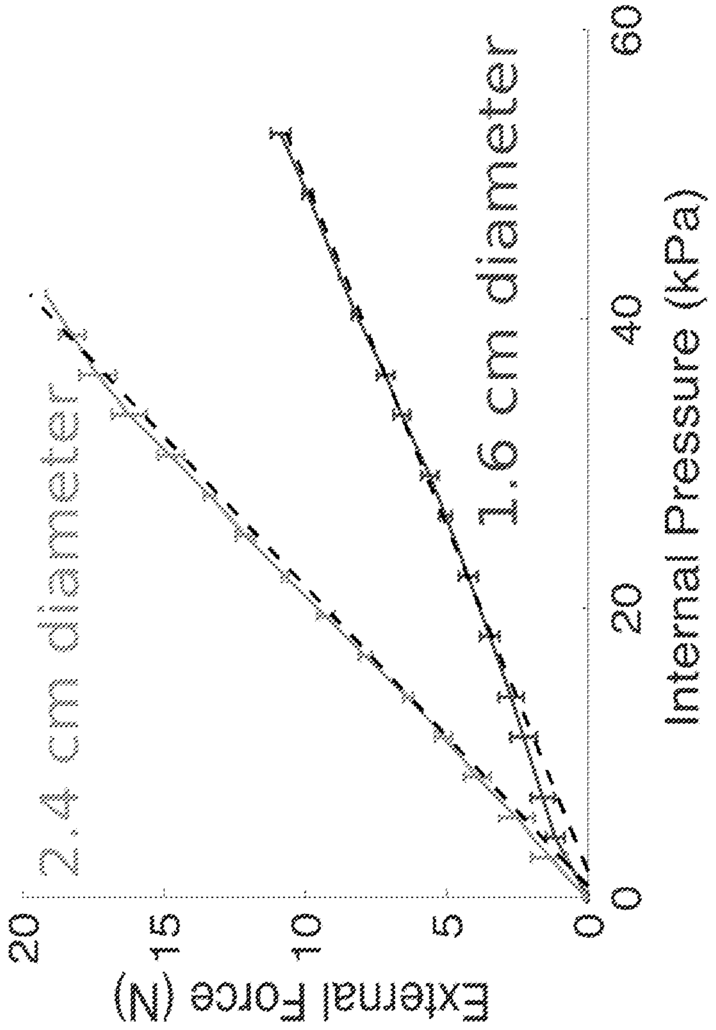
FIG. 3 presents force v internal pressure data from testing of a prototype.

The prototype illustrated in FIGS. 2A-2H was tested and analyzed to verify our model that predicts the force that the tip-extending burrowing device applies to the medium, as described in Eqn. 5. This prediction of force is based on the internal pressure as well as the material and geometry of the body. First, we measured the external force applied by a tip-extending device made of 0.05 mm LDPE, with a diameter of 5.1 cm. This data was used to determine that the values of k and Foffset were 4.0 and 0.38 N respectively, for this thickness of LDPE. These constants were fed into the model, which was then used to predict the behavior of two other sized devices of identical construction and diameters of 2.4 cm and 1.6 cm. The comparison between the predicted and measured external force for a range of pressures is shown in FIG. 3.

We conducted a series of tests to help characterize the behavior of the burrowing device in common store-bought play sand with most grain sizes ranging from 1 mm to 0.1 mm in width.

Effect of Tip-Flow on Burrowing Force: Our first set of tests were designed to isolate and characterize the effect of tip airflow on intrusion force, for which we performed a controlled intrusion experiment using a robotic arm. Unlike the presented robotic burrowing device design, this test intrusion apparatus employed a passive rigid intruder. We 3D-printed an ABS plastic cylindrical intruder (outer diameter of 2.7 cm) and inserted a pneumatic tube (inner diameter of 5 mm) down through the central axis of the intruder and out through the tip to provide fluidization air. We used a regulated air supply and measured the flow of the air with an Omega FMA 1845 mass flowmeter. Before each experiment we measured the pressure of the air from open end of the pneumatic tube with a Honeywell 030PGAA5 pressure sensor using an Arduino Uno.

To execute a position-controlled intrusion maneuver, the intruder was mounted on to the end-effector of a 6-axis Denso robot arm. An ATI Mini 40 force/torque sensor was mounted between the arm and intruder, facilitating intrusion force measurement. For each experiment, the robot was commanded to slowly intrude (0.5 cm/s) vertically into a fluidized bed of play sand. Intrusions were performed with fluidization air at volumetric flow rates of 0, 5, 10, and 15 L/min, and five trials were collected per flow rate. Prior to each experiment, the state of the play sand was reset via bed-fluidization, a process where blowers force air through the porous bottom of the fluidized bed, causing the sand to bubble. After bubbling ceases, the sand is in a loosely packed state with a relatively flat surface. To more-closely mirror the closer material packing of a natural setting, the bed was subsequently shaken with a vibration motor and then manually compacted with a rigid flat plate.

Figure 4:
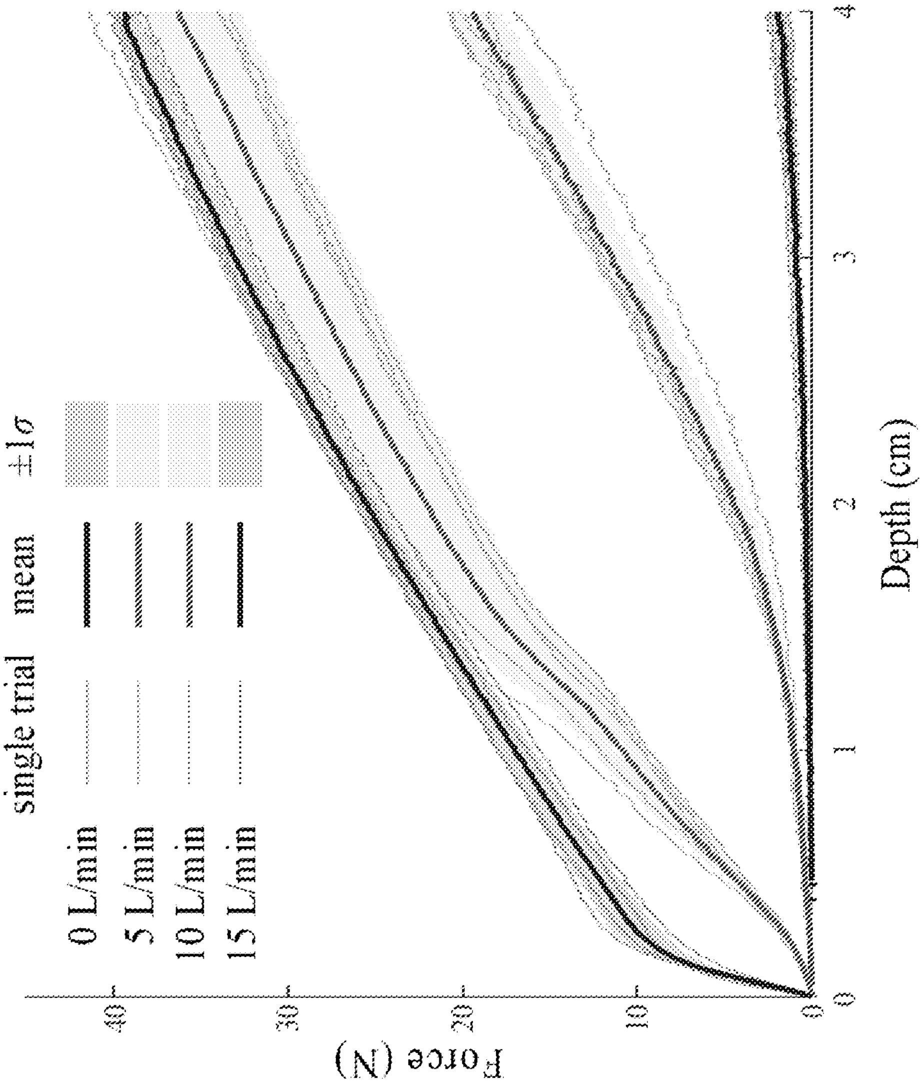
FIG. 4 presents force v depth data from testing of a prototype.

The results of this test using force vs. depth curves, as shown in FIG. 4. There is a significant decrease in the force required to move through the medium as the tip-flow increases. At the maximum depth measured, the force difference between the no-flow case and the peak-flow case was approximately a factor of 50. Note, because forced air flow also has the property of eroding some material away before contact, depth is measured from the point of first contact with non-airborne sand.

Visualization of Effects of Tip-flow: To further understand the effects of the flow of air out of the tip of the device, we performed similar intrusion experiments (as above) but with a transparent wall. For this purpose, we 3D-printed another intruder out of ABS plastic, but with a flattened side to slide directly adjacent to a side wall. We commanded the intruder along a transparent acrylic side wall of the fluidized bed and recorded the motion with AOS high speed camera at 250 fps. Screen captures from these videos were taken at three different depths and four different tip-flows (a video from this test can be seen in the accompanying video). With 5 L/min of flow, a small air channel emerges that shows a small aerated region beneath the intruder. Higher tip-flow creates a visibly larger fluidized area for the 10 and 16 L/min cases. For these experiments the wall effects may alter the air flow patterns to some degree, however, the measured forces during this experiment were in accord with those reported in FIG. 4 which were far from the boundary.

Figure 5:
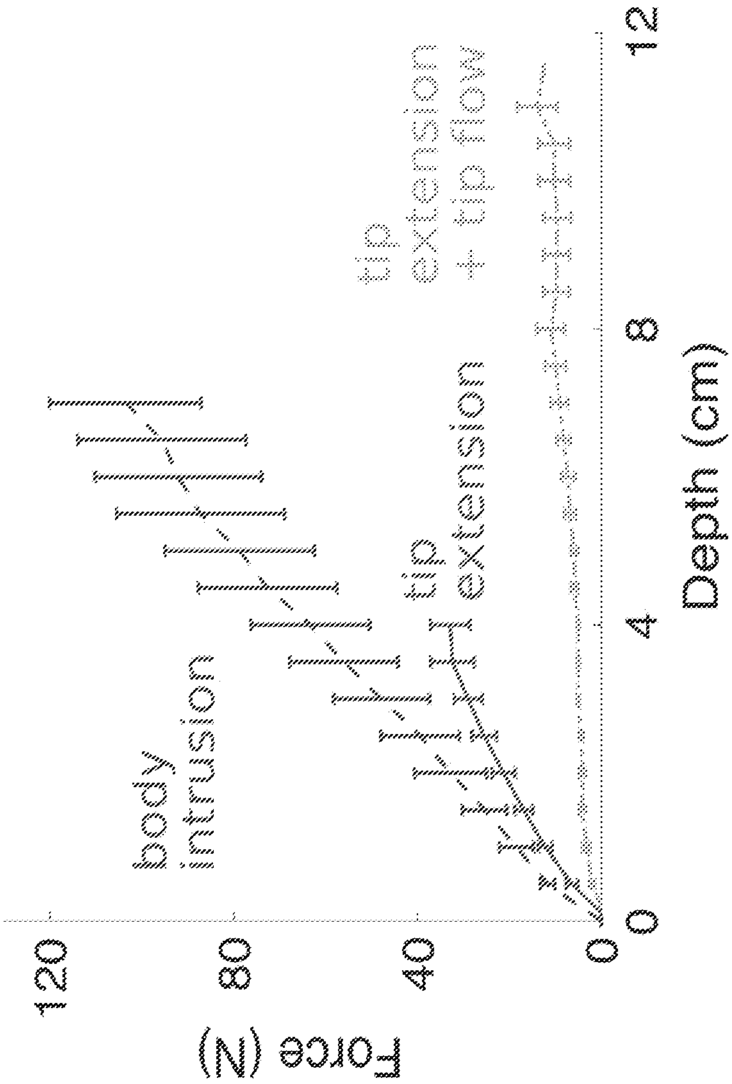
FIG. 5 presents additional force v depth data from testing of a prototype.

Effect of Tip-extension on Burrowing Force: To characterize the effect of tip-extension on the force versus depth relationship for a burrowing device, we extended a burrowing device into play sand and compared it to a passive intruder, neither with tip air flow. The sand was placed in a 25 cm cube container with a sand depth of 20 cm, and was briefly fluidized between each trial to help create a repeatable packing density. For data with the intruder, we used a Mark-10 M3-100 force gauge in series with the intruder to measure the force required to move into the sand as a function of depth for five trials. For data with the tip-extending burrowing device, we measured the internal pressure with a Dwyer 628 0-100 psi pressure transmitter using an Arduino Uno, which was then used to calculate the force applied to the sand using Eqn. 5. Six trials were performed measuring internal pressure as a function of burrowing depth. The results of these tests are shown in FIG. 5. The addition of growth alone creates a decrease in the required force at any given depth. The limit of growth for a soft robot without fluidization is the point at which the growth pressure required to continue would exceed the device's bursting pressure The inventors estimate that with 100 psi provided via a high power water jet for fluidization, a scaled robot of the invention could easily install a power or data line through dirt. The depth would depend on the material of the main both, but ten meters is estimated as a maximum depth. Adding fluidization significantly reduces the force exerted by the environment, such that a robot that could not otherwise grow can now easily grow. For horizontal growth at ten meters or less of depth, the inventors estimate that a robot consistent with the invention could grow to seventy or a hundred meters, making installation of power and data lines through soil practical with a robot of the invention. A thin aramid fiber (e.g., Kevlar) body and sturdy base and fluidization delivery system could easily hold 100+ psi. This strong growing force, along with a high-pressure fluidization air or water jet should be able to burrow to about 10 m deep in soil or sand, and for longer distances at that or lesser depths in a horizontal or generally horizontal direction.

Tip-flow in Combination with Tip-extension: Fluidization increases the limits of growth because less pressure is required for the extension. The highest level of fluidization flow that was achievable for the prototype was 24 L/min, limited by airflow through our ¼" pressure regulator and ⅛" inner diameter tubes connected to the fluidization tube. Measurements of pressure as a function of depth were recorded for six trials, and converted to force vs. depth by Eqn. 5. The results of the tests are also shown in FIG. 5. The slope of the force versus depth curve is decreased by over an order of magnitude when compared to that of a soft everting robot without fluidization.

Analysis of Prototype Testing

The testing revealed interesting advantages of present soft robot for subterranean locomotion. The benefit of the fluidization provided by the present soft robot is revealed in both the shapes of the curves as well as the magnitude of the forces. In the no-flow case, there is an expected "knee" in the curve, which results from a cone of particles accumulating at the tip and reducing the resistance to further motion. When fluidization is added in the range of 5 L/min, the knee disappears. Higher flow rates result in another beneficial effect, the tip flow completely removes sand from in front of the soft robot, such that the force drops to zero for low depths. Interestingly, through 10 L/min, the slopes of the depth versus force curves remain the same.

FIG. 5 shows a flattening out of the force versus depth curve as depth increases, which we attribute to an elimination of drag on the sides of the body, which contributes to the increasing force on the soft robot even without fluidization. The soft robot without fluidization, however, could not pass beyond 4 cm. Referring to Eqn. 6, the robot will stop growing once the resisting force of the medium (Fmedium, which increases with depth) exceeds the force that the robot can apply to the environment at its tip (Fexternal). The achievable depth can be increased with a higher driving pressure or a stronger body material. Fluidization in the present soft robot increases depth for any like soft robot of a selected material and driving pressure. With tip-flow and the resulting fluidization, we see an extremely flattened force versus depth curve, allowing the prototype device to reach beyond 10 cm with well below 20 N of force.

Additional Variations

Figure 6:
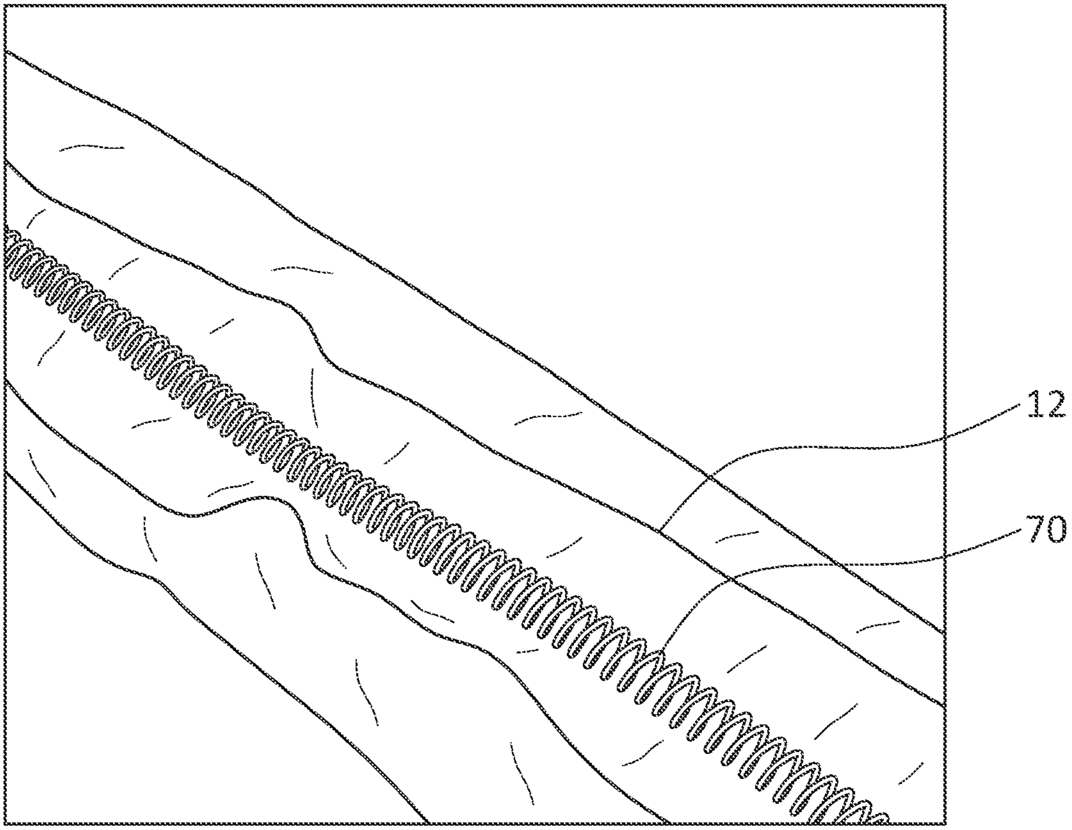
FIG. 6 is a photo of a portion of a prototype with a spring channel for a fluidization tube consistent with FIG. 1B.

The fluidization tube 16 in the prototype was created via two plastic strips with ridges on them. As they lay flat on each other, they create a small pocket for the air. A preferred variation is a long coil spring, sewn into the fabric of the main body. This is more flexible and effective at keeping the inner part of the vine robot open for passing a fluid out of the tip. One prototype, a portion of which is shown in FIG. 6 was constructed with the coil spring 70 sewn into 3 cm diameter body made of a silicone impregnated, 0.05 mm thick ripstop nylon fabric 12 and an air (fluid) tube 72 (clear tube) inside of the coil spring 70. At the tip of the air tube is a rigid hook shaped member that keeps it at the tip of the robot (see FIG. 1B), and points it in a prescribed direction. As the robot grows, it gets pulled along inside of the spring. Air passes through the tube and out a hole in the hook shape, to point it in a prescribed direction.

Figure 7:
FIG. 7 is a photo of a portion of a prototype with steering control via multiple fluidization tubes.

Another variation is to use multiple fluidization tubes. At the tip of the robot, they can point in different directions with tube fittings. FIG. 7 shows a dual fluidization tube robot. By controlling the relative flows of one tube compared to the other, the direction of fluidizing flow out of the tip is controlled. In this prototype, the tubes do not grow along with the robot body, and instead stay at the front. To prevent the robot from spitting out the tube due to the friction between the tube and the inside of the robot, small holes along the tube length preferably leak air to reduce the pressure applied by the robot on it.

Figure 8B:
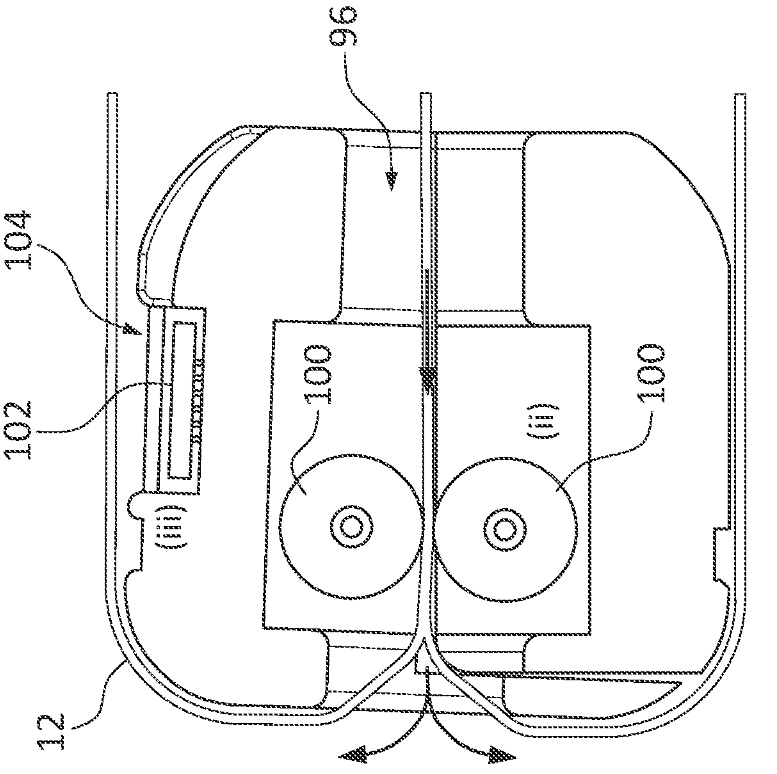
FIGS. 8A-8C illustrate a preferred positional measurement head for a soft robot of the invention.
Figure 8A:
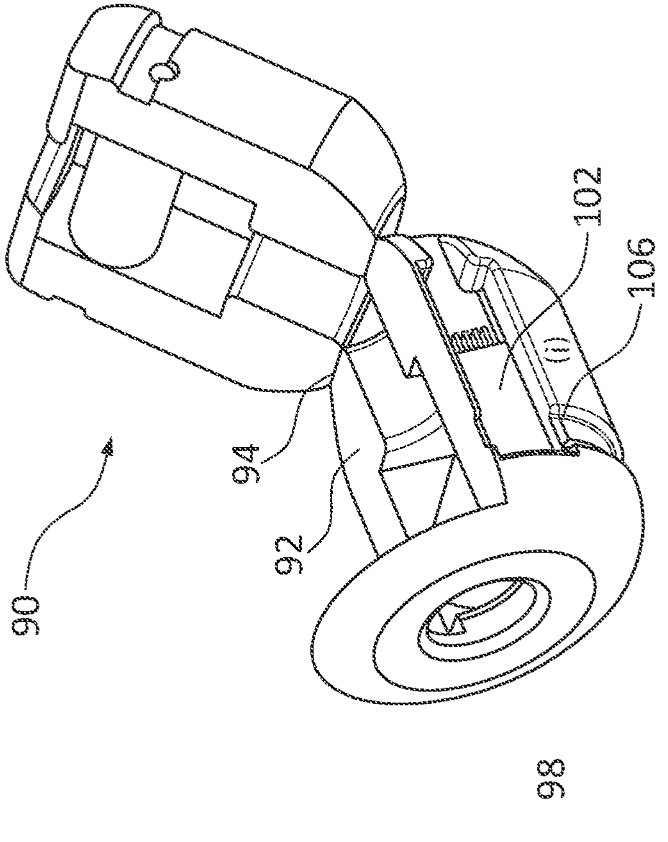

FIGS. 8A and 8B illustrate a preferred head 90 to provide information to track and locate the distal end of the robot. A housing 92 of the head includes a hinged connection 94 to accept the main body of a robot 10 in a lumen 96 that is defined when the head is closed. The lumen terminates in an opening 98 and the housing is shaped to guide everted main body material and fluidization tube back away from the direction of growth as illustrated in FIG. 8B. Opposing rollers 100 rotate in response to growth of the robot 10, while the head remains at the distal end of the robot 10 as it grows. The rollers 100 include encoders from which rotation can provide information about the length and direction of the robot, as analyzed by a microchip 102 mounted in a slot 104 the body 92. Information from the microchip is transmitted back to the user at the base of the extending robot by wires (not illustrated) that are connected to the microchip, and routed through the main robot body back to its base. The head 90 should be of a similar diameter to the soft robot body to keep the head and tip orientation consistent and maintain accurate position estimates. The shape of the head 90 is also curved in such a way as to not restrict turns made by the robot. Curvature of the leading edge is also important for minimizing friction between the growing robot 10 and the head 90 as the robot 10 everts at the tip. Preferably, the spacing between the rollers 100 is self-adjusting. The "clamshell" hinged joint at the trailing edge of the headpiece can server this purposed. The two halves of the headpiece are then joined together by an elastic band element in a channel 106 at the tip of the headpiece which clamps the headpiece closed. This clamping action allows for a consistent pressure on the extruding material between the two rollers, while also allowing for the rollers to separate, as necessary, as the clamshell opens slightly to allow through clumps of material, that would otherwise cause jamming. Alternatively, instead of a clamshell method, a spring could be attached to the axle of the rollers 100 that allows the distance between the rollers 100 to change while maintain frictional rotational contact with the robot as it grows.

Figure 8C:
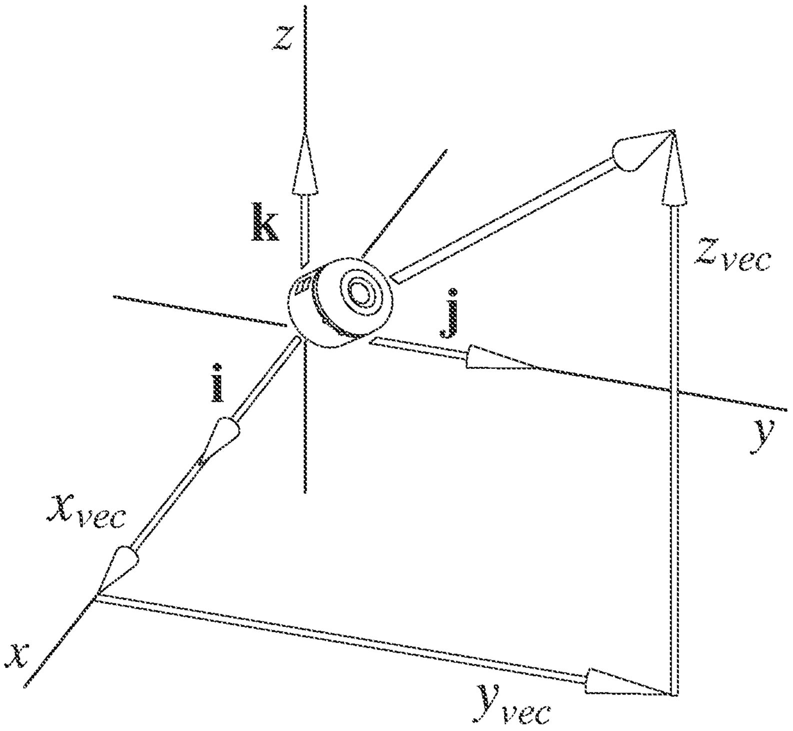

The head 90 permits location to be determined. By determining incremental distances "grown" by the robot, as well as the robot head's average orientation during each increment, the movement of the robot from its origin in three dimensions can be iteratively calculated as the robot grows, which is a form of dead reckoning position determination. Quaternions provide a preferred method of determination. Quaternions are a complex number system which can provide an elegant solution to describing and computing three dimensional rotations of an object. Quaternions are preferred because they are computationally more efficient than other methods and avoid the numerical errors associated with other methods. Specifically, quaternions are immune to gimbal lock, which is caused when two axes of freedom line up, locking the system into a two-dimensional space. Quaternions work by transforming a defined axis of rotation and the new x, y and z components of the transformed unit vector can be found with the following equations. A visualization of these components of robot head orientation can be seen in FIG. 8C.

$$x_{vec}=1-2(q_y^2+q_z^2) \tag{10}$$

$$y_{vec}=2(q_xq_y+q_zq_0) \tag{11}$$

$$z_{vec}=2(q_xq_z-q_yq_0) \tag{12}$$

Here $q_0$, $q_x$, $q_r$ and $q_z$ are the quaternion outputs of the absolute orientation sensor used in robot tracking. While equations 10 through 12 provide the transformed coordinates of the initial unit vector, for the case of robot tracking it is important to have all rotation measurements be in reference to the initial forward direction of the robot head. To do this the $x_{vec}$ and $y_{vec}$ components are shifted to be in reference to the initial angle of the robot head in the x-y plane, $\theta_{h,0}$. This can be seen in equations 13 and 14.

$$x'_{vec}=x_{vec}\cos(\theta_{h,0})-y_{vec}\sin(\theta_{h,0}) \tag{13}$$

$$\underline{y}_{vec}=x_{vec}\sin(\theta_{h,0})+y_{vec}\cos(\theta_{h,0}) \tag{14}$$

Since the initial $z_{vec}$, or the initial digging angle of the robot, is needed in order to determine depth, the z reference frame is not shifted. However, in order to introduce the correct uncertainty measurements into the system, a "rotation" of zero degrees was made about the y axis. This can be seen in equations 15 and 16

$$\underline{x}_{vec}=x'_{vec}\cos(\gamma_{h,0})-z_{vec}\sin(\gamma_{h,0}) \tag{15}$$

$$\underline{z}_{vec}=x'_{vec}\sin(\gamma_{h,0})+z_{vec}\cos(\gamma_{h,0}) \tag{16}$$

Once the robot head orientation is known the movement in x, y and z of the robot during each incremental growth step can be simply calculated by measuring the unit vector components, $\underline{x}_{vec}$, $\underline{y}_{vec}$ and $\underline{z}_{vec}$ by the step distance travelled, d.

$$x_i=d\cdot\underline{x}_{vec} \tag{17}$$

$$y_i=d\cdot\underline{y}_{vec} \tag{18}$$

$$z_i=d\cdot\underline{z}_{vec} \tag{19}$$

By summing each incremental $x_i$, $y_i$ and $z_i$ movement after each step, the absolute x, y and z position from the robot origin can be determined. By plotting the "growth" of the robot in real time in the x-y and x-z plane the position and trailing body structure can be displayed. Furthermore, the real time head orientation can be output to help direct the robot operator's movements.

As with all measurements, uncertainty in equipment leads to an uncertainty in the calculated position of the robot throughout its motion. This uncertainty is position is often displayed as a confidence ellipsoid, where the axes of the ellipsoid are determined by the uncertainty in each spatial dimension. The equation of the confidence ellipse is as follows $$\frac{(x-x_n)^2}{\Delta x^2}+\frac{(y-y_n)^2}{\Delta y^2}+\frac{(z-z_n)^2}{\Delta z^2}=1 \tag{20}$$

In equation 20 Δx, Δy, and Δz represent the uncertainties in the x, y and z dimensions and constitute the axes of the ellipsoid. Uncertainties in each dimension are determined by summing the associated position uncertainties over every growth step taken along the robot's path.

$$\Delta x_i=\Sigma_{i=1}^{n}(\Delta x_{i-1}+\Delta\underline{x}_e) \tag{21}$$

$$\Delta y_i=\Sigma_{i=1}^{n}(\Delta y_{i-1}+\Delta\underline{y}_e) \tag{22}$$

$$\Delta z_i=\Sigma_{i=1}^{n}(\Delta z_{i-1}+\Delta\underline{z}_e) \tag{23}$$

The incremental dimension uncertainties ($\Delta\underline{x}_e$, $\Delta\underline{y}_e$, and $\Delta z_e$) are determined by a conventional uncertainty analysis of their governing equations and are as follows.

$$\Delta\underline{x}_e=\sqrt{(\underline{x}_{vec}\Delta d)^2+(d\,\Delta\underline{x}_{vec})^2} \tag{24}$$

$$\Delta\underline{y}_e=\sqrt{(\underline{y}_{vec}\Delta d)^2+(d\,\Delta\underline{y}_{vec})^2} \tag{25}$$

$$\Delta\underline{Z}_e=\sqrt{(\underline{Z}_{vec}\Delta d)^2+(d\,\Delta\underline{Z}_{vec})^2} \tag{26}$$

$$\underline{y}_{vec}=\sqrt{(\sin(\theta_{h,0})\Delta x_{vec})^2+(\cos(\theta_{h,0})\Delta y_{vec})^2+(x_{vec}\cos(\theta_{h,0})\Delta\theta_{h,0})^2+(y_{vec}\sin(\theta_{h,0})\Delta\theta_{h,0})^2} \tag{27}$$

$$\underline{x}_{vec}=\sqrt{(\cos(\gamma_{h,0})\Delta x'_{vec})^2+(\sin(\gamma_{h,0})\Delta z_{vec})^2+(x'_{vec}\sin(\gamma_{h,0})\Delta\gamma_{h,0})^2+(z_{vec}\cos(\gamma_{h,0})\Delta\gamma_{h,0})^2} \tag{28}$$

$$\Delta z_{vec}=\sqrt{(\sin(\gamma_{h,0})\Delta x'_{vec})^2+(\cos(\gamma_{h,0})\Delta z_{vec})^2+(x'_{vec}\cos(\gamma_{h,0})\Delta\gamma_{h,0})^2+(z_{vec}\sin(\gamma_{h,0})\Delta\gamma_{h,0})^2} \tag{29}$$

$$\Delta x'_{vec}=\sqrt{(\cos(\theta_{h,0})\Delta x_{vec})^2+(\sin(\theta_{h,0})\Delta y_{vec})^2+(x_{vec}\sin(\theta_{h,0})\Delta\theta_{h,0})^2+(y_{vec}\cos(\theta_{h,0})\Delta\theta_{h,0})^2} \tag{30}$$

$$x_{vec}=\sqrt{(4\,q_y\Delta q_y)^2+(4\,q_z\Delta q_z)^2} \tag{31}$$

$$\Delta y_{vec}=\sqrt{(2\,q_y\Delta q_x)^2+(2\,q_x\Delta q_y)^2+\left(2\,q_0\,\Delta q_z\right)^2+(2\,q_z\Delta q_0)^2} \tag{32}$$

$$\Delta z_{vec}=\sqrt{(2\,q_z\Delta q_x)^2+(2\,q_x\Delta q_z)^2+(2\,q_0\Delta q_y)^2+(2\,q_y\Delta q_0)^2} \tag{33}$$

Finally, in addition to the growing dimensional uncertainties of each time step, $\Delta x_i$, $\Delta y_i$, and $\Delta z_i$, there is a constant uncertainty due to the resolution of the encoder. This uncertainty stems from the fact that due to the nature of the encoder we are unaware of the incremental distance grown by the robot between each minimum step size, $2\cdot\Delta d_{resolution}$. Including this constant uncertainty, the final equations for uncertainties in each dimension, which define the axes of our confidence ellipsoid, are as follows $$\Delta x=\Delta x_i+\Delta d_{resolution}\cdot\Delta\underline{x}_{vec} \tag{25}$$

$$\Delta_y=\Delta y_i+\Delta d_{resolution}\cdot\Delta\underline{y}_{vec} \tag{26}$$

$$\Delta z=\Delta z_i+\Delta d_{resolution}\cdot\Delta z_{vec} \tag{27}$$

The specific uncertainties used in this analysis can be seen in Table 1. The uncertainty associated with each incremental distance measurement, Δd was obtained empirically. While there is a resolution uncertainty associated with the discrete step sizes of the encoder, $\Delta d_{resolution}$, this value does not account for all the error seen in distance measurement. The majority of this error comes from non-perfect contact and slipping between the extruding tubing and the rollers used to count distance grown. While some of this slipping can be corrected for by variations in calibration constant, variations in roller cleanliness and tube roughness cause errors in distance measurement to be inevitable. Therefore, in order to quantify uncertainties in distance for each step, several straight-line tests were run, and their results compared to actual measured distances.

The uncertainty in quaternion values output from the absolute orientation sensor were also obtained empirically. Since quaternion values for each incremental distance are determined by averaging all values recorded over that time period, the uncertainties in these values during each step were determined by looking at the standard deviation of the values around their mean.

The uncertainty in initial heading, $\Delta\theta_{h,0}$, is dominated by the fact that the slight size discrepancy between the robot headpiece and the body tubing can lead to the headpiece resting several degrees ajar in the body during motion. The maximum of this offset was measured to be 3°. Similarly, the uncertainty in initial pitch, $\Delta\gamma_{h,0}$, was measured to be 1.5°.

TABLE 1

System Uncertainties

| Uncertainty Variable | Uncertainty Value |
|---|---|
| $\Delta d$ | ±.0043 in |
| $\Delta d_{resolution}$ | ±.0427 in |
| $\Delta q_0$ | ±(0 to .02) |
| $\Delta q_x$ | ±(0 to .02) |
| $\Delta q_y$ | ±(0 to .02) |
| $\Delta q_z$ | ±(0 to .02) |
| $\Delta\theta_{h,0}$ | ±3° |
| $\Delta\gamma_{h,0}$ | ±1.5° |

The position determination will be conducted by the microchip 102. It is preferred that multiprocessing is used to separate three separate processes. The first, most time sensitive, process reads the raw data and finds the average of each quaternion for each encoder step. It then finds the standard deviation each time the encoder is counted. It then sends this data for the second process which takes care of the math necessary in determining the head's location and the associated uncertainty. Once the calculations are complete, the location data is sent to the final process. This last process is in charge of the graphing of the data as quickly as possible so that the user can use the output to steer the robot.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A soft robot, comprising:
- a flexible and airtight main body configured as a tube inverted back inside itself to define a pressure channel, such that when the channel is pressurized, the main body everts, and inverted material everts and passes out of a tip at a distal end of the main body;
- a fluidization tube for passing air or other fluid through a core of the main body in the fluidization tube, wherein the fluidization tube engages the main body such that the fluidization tube is ejected as the distal end as the main body everts and joins part of the side of the main body as the main body everts and extends its distal tip.

2. The soft robot of claim 1, wherein the main body comprises air/fluid tight material.

3. The soft robot of claim 1, wherein the main body comprises a flexible, air/fluid tight membrane.

4. The soft robot of claim 1, the fluidization tube comprises a plurality of fluidization tubes and the robot comprises control to control relative flows among the plurality of fluidization tubes for steering control.

5. The soft robot of claim 1, wherein the main body comprises silicone or coated fabric.

6. The soft robot of claim 1, wherein the fluidization tube comprises a rigid tube or flexible coil.

7. A soft robot, comprising:
- a main body configured as a tube inverted back inside itself to define a pressure channel, such that when the channel is pressurized, the main body everts, and inverted material everts and passes out of a tip at a distal end of the main body;
- a fluidization tube for passing air or other fluid through a core of the main body in the fluidization tube, wherein the fluidization tube engages the main body such that the fluidization tube is ejected as the distal end as the main body everts and joins part of the side of the main body as the main body everts and extends its distal tip, wherein the fluidization tube comprises a coil spring with a tube inside, and the coil spring is sewn to the main body.

8. A soft robot, comprising:
- a main body configured as a tube inverted back inside itself to define a pressure channel, such that when the channel is pressurized, the main body everts, and inverted material everts and passes out of a tip at a distal end of the main body;
- a fluidization tube for passing air or other fluid through a core of the main body in the fluidization tube, wherein the fluidization tube engages the main body such that the fluidization tube is ejected as the distal end as the main body everts and joins part of the side of the main body as the main body everts and extends its distal tip, wherein the main body comprises aramid fibers.

9. A soft robot, comprising:
- a main body configured as a tube inverted back inside itself to define a pressure channel, such that when the channel is pressurized, the main body everts, and inverted material everts and passes out of a tip at a distal end of the main body;
- a fluidization tube for passing air or other fluid through a core of the main body in the fluidization tube, wherein the fluidization tube engages the main body such that the fluidization tube is ejected as the distal end as the main body everts and joins part of the side of the main body as the main body everts and extends its distal tip, wherein the fluidization tube is split lengthwise and attached to opposite sides of the main body such that the fluidization tube splits and follows opposite sides of the main body during growth.

10. A soft robot, comprising:
- a main body configured as a tube inverted back inside itself to define a pressure channel, such that when the channel is pressurized, the main body everts, and inverted material everts and passes out of a tip at a distal end of the main body;
- a fluidization tube for passing air or other fluid through a core of the main body in the fluidization tube, wherein the fluidization tube engages the main body such that the fluidization tube is ejected as the distal end as the main body everts and joins part of the side of the main body as the main body everts and extends its distal tip, wherein the fluidization tube comprises a coil spring with a tube inside, and the coil spring is sewn to the main body, wherein the fluidization tube comprises a hook shaped member and an opening in the fluidization tube that is positioned by the hook shaped member.

11. A soft robot, comprising:

a main body configured as a tube inverted back inside itself to define a pressure channel, such that when the channel is pressurized, the main body everts, and inverted material everts and passes out of a tip at a distal end of the main body;

a fluidization tube for passing air or other fluid through a core of the main body in the fluidization tube, wherein the fluidization tube engages the main body such that the fluidization tube is ejected as the distal end as the main body everts and joins part of the side of the main body as the main body everts and extends its distal tip, wherein the main body comprises a fabric and further comprising a bladder within the main body to seal the pressure channel that causes the main body to evert.

12. The soft robot of claim 11, wherein the fabric comprises a nylon fabric and the tube of the main body is formed by an elongate strip that is sewn together.

13. The soft robot of claim 12, wherein the fluidization tube comprises two halves joined together when the main body is formed into a tube.

14. A soft robot, comprising:

a main body configured as a tube inverted back inside itself to define a pressure channel, such that when the channel is pressurized, the main body everts, and inverted material everts and passes out of a tip at a distal end of the main body;

a fluidization tube for passing air or other fluid through a core of the main body in the fluidization tube, wherein the fluidization tube engages the main body such that the fluidization tube is ejected as the distal end as the main body everts and joins part of the side of the main body as the main body everts and extends its distal tip, further comprising a head at a distal end of the robot, wherein the head comprises opposing rollers that engage the main body and rotate in response to eversion of the main body, the head further comprising a microchip that conducts processes to measure rotation of the rollers and determine position of the head by dead reckoning.

15. The soft robot of claim 14, wherein the head defines through which the main body travels.

16. The soft robot of claim 14, wherein the head comprises a curved front surface configured to guide everted main body material and fluidization tube back away from the direction of growth.

17. The soft robot of claim 14, wherein the rollers are self-adjusting to have a variable distance between them in response to variations in the main body.

18. The soft robot of claim 17, wherein the main body comprises a hinged clamshell, and further comprising an elastic band opposite a hinge to provide the self-adjusting of the rollers.

* * * * *